United States Patent [19]

Westerlund

[11] Patent Number: 4,927,171
[45] Date of Patent: May 22, 1990

[54] VEHICLE SUSPENSION SYSTEM

[75] Inventor: Nils G. Westerlund, Kungalu, Sweden

[73] Assignee: The Secretary of State for Trade and Industry in Her Brittanic Majesty's Government of the United Kingdom of Great Britain and Northern Ireland, London, United Kingdom

[21] Appl. No.: 288,084

[22] PCT Filed: Apr. 24, 1987

[86] PCT No.: PCT/GB87/00272
§ 371 Date: Dec. 13, 1988
§ 102(e) Date: Dec. 13, 1988

[87] PCT Pub. No.: WO87/06540
PCT Pub. Date: Nov. 5, 1987

[30] Foreign Application Priority Data

Apr. 24, 1986 [GB] United Kingdom ............... 8610029

[51] Int. Cl.⁵ .............................................. B60G 11/02
[52] U.S. Cl. .................................. 280/718; 267/36.1; 267/41; 267/47
[58] Field of Search ............... 280/718, 720; 267/36.1, 267/38, 41, 47

[56] References Cited

U.S. PATENT DOCUMENTS 3,860,259  1/1975  Allison et al. .................... 280/720
3,895,819  7/1975  Willetts .
4,771,997  9/1988  Haldenwanger et al. ......... 280/720

FOREIGN PATENT DOCUMENTS

WO86/00266  1/1986  European Pat. Off. .
2243371     4/1971  France .
2528364    12/1982  France .
2529839     1/1984  France .
58-105815   6/1983  Japan .
965        of 1916  United Kingdom .

Primary Examiner—Kenneth R. Rice
Attorney, Agent, or Firm—Nixon & Vanderhye

[57] ABSTRACT

A vehicle suspension unit has two arms joined together at one end by a cross-member. Each arm is formed from two fiber reinforced plastic springs separated by the cross-member at the end, by a spacing member of resilient material, and secured together at another end. The ends which are secured together are attached to a vehicle structure. Wheel mountings are situated near the ends which are separated by the cross-member. Constraining members keep the arms away from vehicle structure in the region of the spacing member.

25 Claims, 3 Drawing Sheets

VEHICLE SUSPENSION SYSTEM

The present invention relates to vehicle suspension systems, and in particular to systems for use with the rear wheels of front wheel drive vehicles.

Vehicles which are required to operate in environments where uneven surfaces may be encountered, including all vehicles for road use, have to allow for movement of the wheels (other than rotational movement) relative to the vehicle. To this end systems known as suspension systems are interposed between the wheels and the vehicle. Suspension systems normally contain springing means and shock absorber means. The springs can be, for example, leaf springs, helical springs or torsion bars. In the case of front wheel drive vehicles one would expect that suspension systems for the rear wheels, which do not transmit driving force and which are not steered, would be comparatively simple. However in practice it is found that design of such systems is complicated by the need to keep camber and tracking angles within close limits as wheels move relative to the vehicle bodies. As a result the weight of such system is significant. There is therefore a need to simplify the design of, and reduce the weight of, suspension systems for non-driven rear wheels.

There has been considerable interest recently in the use of Fibre Reinforced Plastics (FRP) materials in vehicle construction. These materials can provide strengths comparable with those of metals, can result in considerably lighter structures, and have a further advantage in being corrosion resistant. The present invention makes use of FRP materials to provide a simplified, relatively light, rear wheel suspension system.

According to the present invention a vehicle suspension unit includes two arms secured together by and perpendicular to a cross member, each arm comprising two cantilever springs formed from FRP material which are secured together at each of a first and a second end of the arm and which between these ends are separated in a plane of the arms and cross-member by the cross-member and by a spacing member positioned between the first and second ends.

The spacing member is preferably adapted to resist relative vertical movement of the springs whilst allowing relative horizontal movement. The spacing member may be secured to one spring, making sliding contact with the other. Alternatively the spacing member may be formed from a resilient material. Advantageously the spacing member maintains the springs apart by the same distance as they are maintained apart by the cross member.

The cross member may consist of a single beam, or may include a number of beams or rods, and may be formed from metal, from FRP material, or from a combination of these materials.

One pair of ends, preferably the first ends, of the arms include means whereby they can be attached to a vehicle, and the other ends include means whereby a wheel may be attached thereto, the cross member being preferably secured to the arms at or adjacent to the other ends. It will often be preferable that the axis of wheel attachment means passes through the cross-member.

In one form of the invention a constraining member may be secured to an outward facing side of one of corresponding springs on each of the arms at the position of the spacing members.

According to another facet of the invention a vehicle includes a suspension unit having two arms secured together by and perpendicular to a cross member, each arm comprising two cantilever springs formed from FRP material which are secured together at each of a first and a second end of the arm and which between these ends are separated, in a plane perpendicular to a plane of the arms and cross-member, by the cross-member and by a spacing member at a position between the first and second ends, the first ends being attached to the vehicle and the second ends having wheels attached thereto, the cross-member being secured to the arms at or adjacent the second ends, there being a constraining member extending between each arm and the vehicle.

Each constraining member preferably contacts its associated arm at or adjacent the position of the spacing member.

The first ends may be rigidly secured to the vehicle, or may be mounted on spigots such that they are free to rotate in a plane at right angles to the plane of the arms and cross member. The constraining members may be secured to the cantilever springs, or to the vehicle.

It will be realised that shock absorbers will be required, as in conventional suspension systems, and the attachment of these shock absorbers (which form no part of the present invention) between vehicle and wheels can be expected to be such as to prevent rotationally mounted suspension units from rotating too far in instances where both rear wheels lose contact with the ground. Alternatively the units may be restrained by, for example, channel sections or rectangular apertures, through which the cross-member pass, in the constraining members, the constraining members being secured to the vehicle.

Some embodiments of the invention will now be described, by way of example only, with reference to the accompanying diagrammatic drawings, of which:

Figure 1:
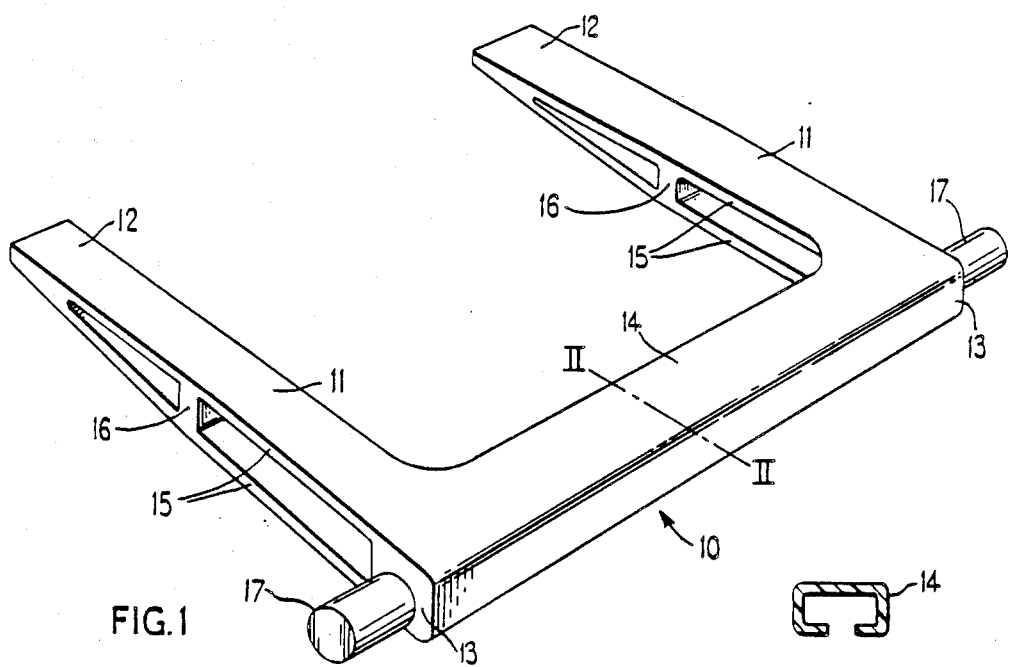
FIG. 1 is a perspective view of a suspension unit according to the invention.
Figures 3, 5:
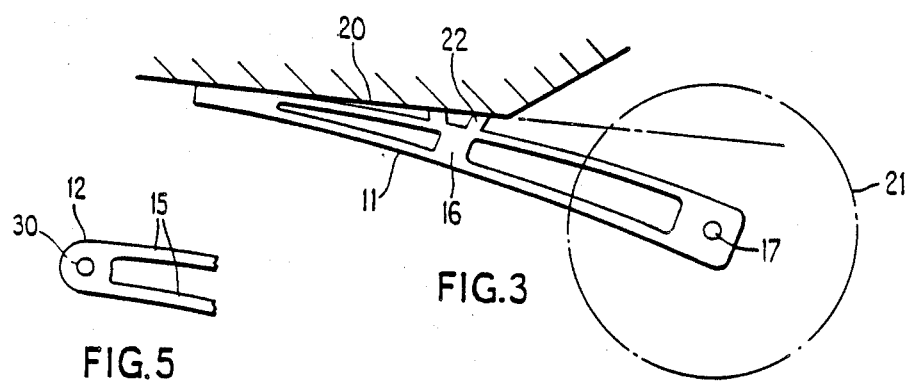
Figure 4:
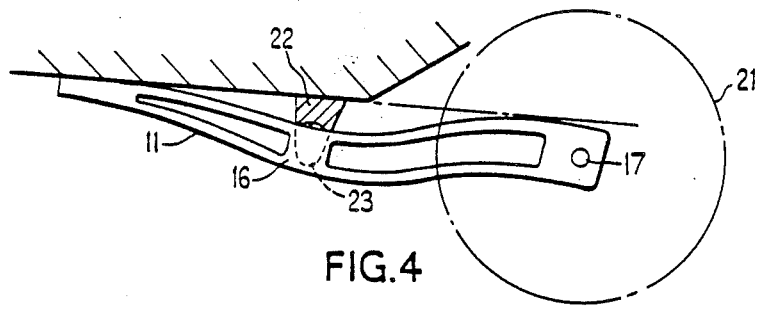
Figure 6A:
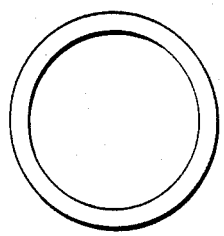
Figure 6B:
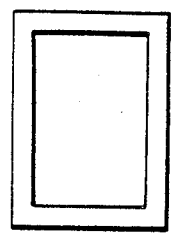
Figure 6C:
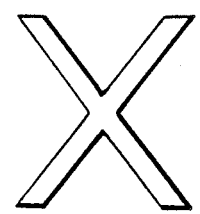
Figure 6D:
Figure 6E:
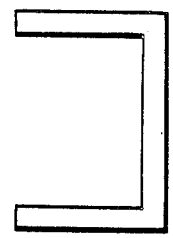
Figure 7A:
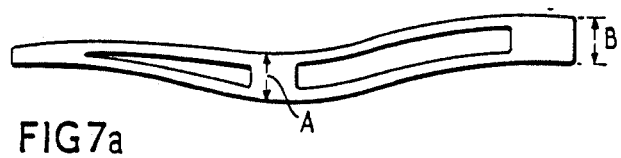
Figure 7B:
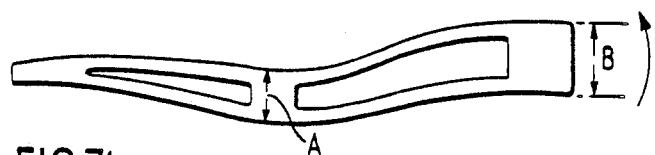
Figure 7C:
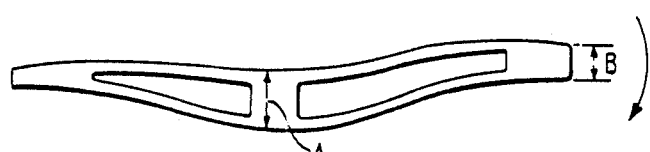
Figure 6F:
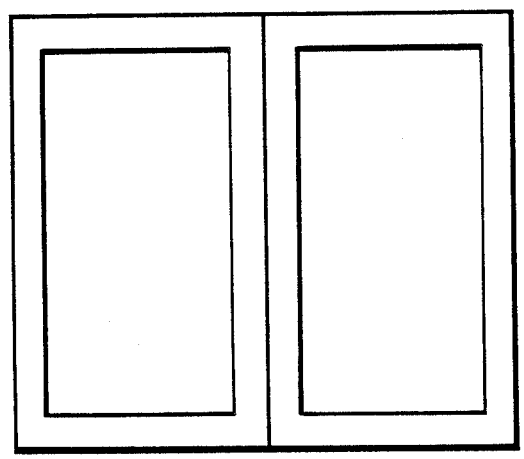
Figure 8:
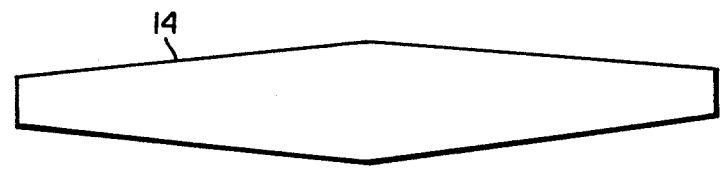

FIG. 3 is an elevation of a suspension unit similar to that shown in FIG. 1 secured to a vehicle and with a wheel mounted thereon, FIG. 4 is an elevation of a suspension unit similar to that shown in FIG. 3, FIG. 5 is an elevation of a detail of an alternative form of an end of a suspension unit, FIGS. 6a–f are sections of alternative forms of cross-member FIGS. 7a–c are elevations of three forms of suspension unit arm and FIG. 8 is an end view of the cross-member illustrating variations in its cross-section along its length.

Figure 2:
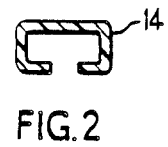
FIG. 2 is a perspective view in section along line II—II of FIG. 1.

A suspension unit (FIG. 1) 10 has two arms 11 each having a first end 12 and a second end 13, the arms 11 being joined together at their ends 13 by a cross-member 14. Each arm 11 is formed from two cantilever springs 15 of FRP material which are secured together at the ends 12, but which are otherwise separated by the cross member 14 and by a spacing member 16 of resilient material at a position between the first 12 and second 13 ends. Wheel mountings 17 are situated at the second ends. The cross-member 14 is preferably formed from FRP material and can have a C-shaped cross section (FIG. 2) or similar section (FIGS. 6a–6e). Alternatively the cross-member may be formed from a plurality (for example 4) of transverse rods which may be of FRP material, metal, or a mixture of these materials.

Units such as 10 are mounted on vehicles, of which a part is shown at 20 in FIGS. 3 and 4, by having the ends 12 of arms 11 secured thereto by, for example, mechanical means or bonding. Wheels 21 are mounted on the axles 17. Constraining members 22 maintain a gap between the arms 11 and vehicle 20 at the position of the spacing member 16. The constraining member 22 may be secured to the arm 11 and rest against body work of the vehicle 20 as illustrated in FIG. 3, or vice versa as illustrated in FIG. 4. Preferably the constraining member 22 is secured to the vehicle and has legs, such as that illustrated in dotted lines at 23 on FIG. 1, extending on each side of the arm 11 to restrain lateral movement thereof.

In an alternative means of attaching the arms 11 to the vehicle 20 first ends 12 of the arms 11 have bores 30 therein to allow the unit 10 to be attached to the vehicle 20 by means of a spigot arrangement. With this arrangement the unit 10 can rotate relative to the vehicle 20 in a plane normal to the plane of the arm 11 and cross-member 14.

In use movements of the wheel 21 relative to the vehicle 20 caused by for example, acceleration, deceleration or irregularities in road surface, are accommodated by bending of the cantilever springs 15, as can be seen by comparing FIGS. 3 and 4 which illustrate different positions of wheels 21, relative to vehicle 20.

It will usually be preferable that the cross-member 14 should not twist relative to the axis of wheels 21 as the cantilever springs 15 bend. Should cross-member 14 twist there will be twisting along its length when arms 11 bend to different extents due to, for example, bumps in a road surface or to cornering. To avoid twisting a separation A (FIGS. 7a to c) between springs 15 at the position of the spacing member 16 should equal a separation B at the point where the springs 15 are secured to the cross-member 14.

It will be realised that vehicles using units 10 such as those illustrated and described above will also require to be fitted with shock absorbers. These form no part of the invention, and for clarity are not illustrated or described herein. However their attachment to the vehicle 20 and to the structure of the unit 10 will act as a restraint to prevent excessive rotation of rotationally mounted units 10 relative to vehicles 20.

It will be realised that many configurations of the arms 11 and of the cross-members 14 are possible within the scope of the invention. Also, as an alternative to spacing members 16 of elastomeric material, spacing members 16 may be secured to one cantilever spring 15 and make sliding contact with the other spring 15. It will, of course, be realised that there must be some accommodation for relative horizontal movements between springs 15 of an arm 11. It will also be realised that the invention provides a wheel mounting system which minimises relative angular movement, in the camber or tracking sense, of one wheel 21 relative to another as the wheels move relative to the vehicle 20 on which they are mounted.

Many alternative sections for the cross-member will be apparent to those skilled in the art. The section may vary along the length of the cross-member.

The constraining members 22 when mounted on the vehicle 20 may be of a form including channel or rectangular apertures in which the arms 11 are enclosed. Members 22 may be movable relative to the body work to vary the spring characteristics of the unit 10 in response to changes in vehicle loading or to the demands of an active suspension system controller.

Whilst the cross-member 14 has been described and illustrated as situated at the ends 13 of arms 11 this need not be so. It may be advantageous, in some embodiments, for the cross-member 14 to be situated some distance inwards from ends 13. Also it is not essential for all embodiments of the invention that the axis of wheels 21 pass through the cross-member 14 as illustrated.

What is claimed is:

1. A vehicle suspension unit including two arms secured together by and perpendicular to a cross member, each arm comprising two cantilever springs formed from fibre reinforced plastics material which are secured together at each of a first and a second end of the arm and which between these ends are separated in a plane perpendicular to a plane of the arms and cross-member by the cross-member and by a spacing member at a position between the first ends and the cross-member.

2. A vehicle suspension unit as claimed in claim 1 wherein the spacing member resists relative vertical movement whilst allowing relative horizontal movement of the springs.

3. A vehicle suspension unit as claimed in claim 2 wherein the spacing member is formed from an elastomeric substance.

4. A vehicle suspension unit as claimed in claim 2 wherein the spacing member is secured to one spring and makes sliding contact with the other spring.

5. A vehicle suspension unit as claimed in claim 1 wherein the springs are separated to the same distance by the spacing member and by the cross-member.

6. A vehicle suspension unit as claimed in claim 1 wherein the cross-member is secured to the arms at the second ends.

7. A vehicle suspension unit as claimed in claim 1 wherein the cross-member includes a plurality of beams or rods.

8. A vehicle suspension unit as claimed in claim 6 or in claim 7 wherein the section of the cross-member varies along its length.

9. A vehicle suspension unit as claimed in claim 1 wherein the first end of each arm is adapted to be attached to a vehicle and the second end of each arm includes means whereby a wheel can be attached thereto.

10. A vehicle suspension unit as claimed in claim 1 wherein the cross-member is formed from fibre reinforced plastics material.

11. A vehicle suspension unit as claimed in claim 1 wherein a constraining member is secured to an outward facing side of one of corresponding springs on each of the arms.

12. A vehicle suspension unit as claimed in claim 11 wherein the constraining members are secured to the springs at the position of the spacing members.

13. A vehicle including a suspension unit as claimed in claim 1, the unit being attached to the vehicle at the first end of each arm and there being a constraining member positioned between the vehicle and each arm of the unit to separate the vehicle and unit.

14. A vehicle as claimed in claim 13 wherein the unit is secured to the vehicle by mechanical means.

15. A vehicle as claimed in claim 13 wherein the unit is bonded to the vehicle.

16. A vehicle as claimed in claim 13 wherein the unit is attached to the vehicle by means of spigots passing through bores in the first end of each arm.

17. A vehicle as claimed in claim 13 wherein the constraining members are secured to the arms.

18. A vehicle as claimed in claim 13 wherein the constraining members are attached to the vehicle.

19. A vehicle as claimed in claim 18 wherein the constraining members are movable relative to the vehicle.

20. A vehicle as claimed in claim 18 wherein the constraining members are adapted to resist movement of the arms in the plane of the arms and cross-member.

21. A vehicle as claimed in claim 18 wherein the constraining members are adapted to limit rotation of the unit away from the vehicle.

22. A vehicle suspension unit comprising:
a pair of arms spaced one from the other and extending generally parallel to one another;
a cross-member extending generally perpendicular to and connecting said arms, with said arms and cross-member extending in a plane defined thereby;
each arm including a pair of cantilever springs formed of fibre reinforced plastics material secured one to the other adjacent opposite ends of the arm and being spaced one from the other in a direction normal to said plane; and
a spacing member disposed between the spaced springs in each arm at a location between said arm ends and spaced from said cross-member.

23. A vehicle suspension unit according to claim 22 wherein each said spacing member resists relative movement in a direction generally normal to said plane, while allowing relative movement of the springs in a direction generally parallel to said plane.

24. A vehicle suspension unit according to claim 22 wherein each said spacing member is secured to one spring and makes sliding contact with the other spring.

25. A vehicle suspension unit according to claim 22 wherein said cross-member is secured to said arms adjacent one end thereof, the opposite ends of said arms being adapted for attachment to the vehicle.

* * * * *